March 28, 1939.   M. H. FIELD   2,152,544
AUTOMATIC BRAKE ADJUSTER
Filed Aug. 5, 1938
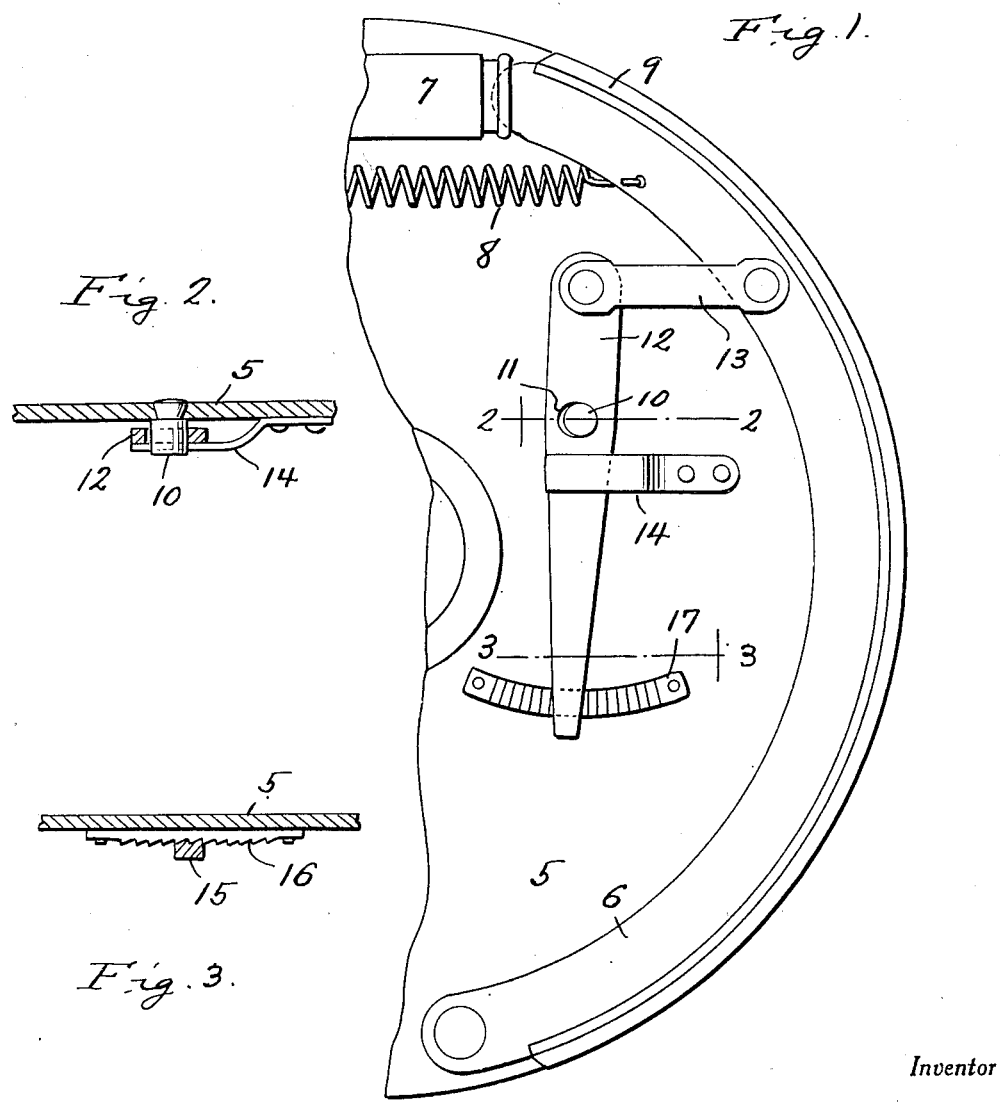
Inventor
Marcus H. Field
By Clarence A. O'Brien
and Hyman Berman
Attorneys Patented Mar. 28, 1939

2,152,544

UNITED STATES PATENT OFFICE 2,152,544

AUTOMATIC BRAKE ADJUSTER

Marcus H. Field, Canton, Ga., assignor of one-third to R. I. Lathem, Canton, Ga.

Application August 5, 1938, Serial No. 223,298

3 Claims. (Cl. 188—79.5)

This invention relates to automatic brake adjusters and has for the primary object the provision of a device of this character which will automatically adjust the brake shoes of a hydraulic brake relative to the brake drum as wear occurs on the lining of the shoes, so that efficient operating brakes may be maintained without manual attention for the life of the lining and which will not interfere with the normal movement of the shoes when engaging and disengaging the drum and which may be manufactured and sold at a low cost and easily adapted to brakes now in use.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view illustrating a brake adjuster connected with a brake shoe of a hydraulic brake and constructed in accordance with the present invention.

Figure 2 is a sectional view taken on line 2—2 of Figure 1.

Figure 3 is a sectional view taken on line 3—3 of Figure 1.

Referring in detail to the drawing, the numeral 5 indicates the usual dust plate or guard associated with a brake drum (not shown) and on which is pivotally mounted a brake shoe 6. It is to be understood that it is customary to have a pair of brake shoes pivotally mounted on the dust plate 5 for coaction with the drum and as each brake shoe will have the present invention adapted thereto it is not thought necessary to illustrate both brake shoes. The hydraulic means for imparting movement to the brake shoe 6 towards the brake drum is indicated by the character 7 and is of a conventional construction. The brake shoe 6 is normally urged away from the brake drum by a coil spring 8. The foregoing description briefly sets forth a construction of a hydraulically operated brake shoe to which the present invention is adapted for the purpose of automatically adjusting the brake shoe relative to the drum as wear occurs on the lining 9 of the brake shoe.

A pin 10 is secured on the dust plate 5 and is received in a slot 11 of an adjusting lever 12 whereby the latter may have a limited sliding movement as well as a pivotal movement on the dust plate 5. One end of the lever 12 has pivoted thereto a link 13 which is in turn pivoted on the brake shoe 6 at a selected distance from the end of the brake shoe which is in engagement with the hydraulic operating means 7. A leaf spring 14 is secured on the dust plate 5 and overlies the lever 12 to retain the latter on the pivot pin 10. The other end of the lever 12 is provided with teeth 15 to engage with ratchet type teeth 16 formed on a bar 17 mounted on the dust plate and arranged at substantially right angles to the lever.

In operation, the pivotal connection between the adjusting lever 12 and the dust plate 5 will permit the brake shoe to have normal pivotal movement towards and from the brake drum for the purpose of application and release of the braking action on the drum. However, when wear occurs on the lining 9 which will permit the brake shoe to increase its pivotal movement towards the drum in order to bring about braking action, the toothed end of the adjusting lever advances a tooth on the bar 17 so that the brake shoe on returning to non-drum-engaging position under the influence of the spring 8 it will be checked in this movement so that on the application or actuation of the brake shoe again in engagement with the drum the distance of travel of the brake shoe towards the drum will again be normal and consequently bring about proper braking action on the drum.

The device shown and described in detail is simple in construction and operation and may be readily applied to any brake of the hydraulic type now in use by simply mounting the adjusting lever and the bar 17 on the dust plate of the brake drum for a limited pivotal and sliding movement and connecting the adjusting lever to the brake shoe by the link 13. The simplicity of the construction will permit the device to be manufactured and sold at a low cost and also will permit the application of the device to brakes at a nominal sum and will eliminate the necessity of frequently manually adjusting the brake shoes.

It is believed that the foregoing description when taken in connection with the drawing will fully set forth the construction and advantages of this invention to those skilled in the art to which such a device relates, so that further detailed description will not be required.

What is claimed is:

1. An automatic brake adjuster comprising an adjusting lever, means for mounting said lever for pivotal and a limited sliding movement on a dust plate of a brake drum, means for connecting one end of the lever to a brake shoe associated with the drum, and a ratchet mechanism associated with the other end of said lever and carried by the dust plate.

2. An automatic brake adjuster comprising an adjusting lever, means for mounting said lever for pivotal and a limited sliding movement on a dust plate of a brake drum, means for connecting the lever to a brake shoe associated with the drum, teeth formed on the lever, and a rack bar having ratchet type teeth engageable with the teeth of the lever and mounted on the dust plate.

3. An automatic brake adjuster comprising a pin mounted on a dust plate of a brake drum, a lever having a slot to receive said pin for pivotal movement and a limited sliding movement, a link pivoted to said lever and to a brake shoe associated with the brake drum, teeth formed on said lever, a rack bar including ratchet type teeth mounted on the dust plate and engaging the teeth of said lever, and a leaf spring secured on the dust plate and overlying the lever to retain the latter on the pivot pin.

MARCUS H. FIELD.